United States Patent
Storz

(10) Patent No.: US 9,810,772 B2
(45) Date of Patent: Nov. 7, 2017

(54) RADAR SIGNAL GENERATOR

(71) Applicant: Navico Holding AS, Egersund (NO)

(72) Inventor: Gregor Storz, Auckland (NZ)

(73) Assignee: NAVICO HOLDING AS, Egersund (NO)

(*) Notice: Subject to any disclaimer, the term of this patent is extended or adjusted under 35 U.S.C. 154(b) by 260 days.

(21) Appl. No.: 14/714,808

(22) Filed: May 18, 2015

(65) Prior Publication Data

US 2016/0252606 A1  Sep. 1, 2016

Related U.S. Application Data

(60) Provisional application No. 62/126,366, filed on Feb. 27, 2015.

(51) Int. Cl.
| | | |
|---|---|---|
| *G01S 7/282* | (2006.01) | |
| *G01S 13/28* | (2006.01) | |
| *G01S 13/93* | (2006.01) | |
| *G01S 7/288* | (2006.01) | |

(52) U.S. Cl.
CPC ........... *G01S 7/282* (2013.01); *G01S 13/282* (2013.01); *G01S 13/9307* (2013.01); *G01S 2007/2886* (2013.01)

(58) Field of Classification Search
CPC ... G01S 7/02; G01S 7/28; G01S 7/282; G01S 7/288; G01S 2007/2886; G01S 13/02; G01S 13/06; G01S 13/08; G01S 13/10; G01S 13/26; G01S 13/28; G01S 13/282; G01S 13/88; G01S 13/93; G01S 13/9307; G01S 13/931; G01S 13/103; G01S 13/106; H03C 3/02; H03C 3/09; H03C 3/0908; H03C 3/095; H04L 27/32; H04L 27/34; H04L 27/36; H04L 27/361; H04L 27/362; H04L 27/363
See application file for complete search history.

(56) References Cited

U.S. PATENT DOCUMENTS

| | | | |
|---|---|---|---|
| 3,713,154 A * | 1/1973 | Kummer | ............... G01S 13/106 342/107 |
| 4,021,805 A | 5/1977 | Effinger et al. | |
| 4,028,700 A | 6/1977 | Carey et al. | |
| 4,047,173 A | 9/1977 | Miller | |
| 4,114,154 A | 9/1978 | Sarfati | |
| 4,211,485 A | 7/1980 | Koreicho | |
| 4,216,474 A | 8/1980 | Levine | |
| 4,243,988 A | 1/1981 | Kang et al. | |
| 4,328,495 A | 5/1982 | Thue | |

(Continued)

FOREIGN PATENT DOCUMENTS

| | | |
|---|---|---|
| CN | 101464513 A | 6/2009 |
| JP | 2982769 B2 | 11/1999 |
| JP | 2009-128278 A | 6/2009 |

*Primary Examiner* — Bernarr E Gregory
(74) *Attorney, Agent, or Firm* — Nelson Mullins Riley & Scarborough LLP

(57) ABSTRACT

Various implementations described herein are directed to an apparatus having a transmit signal generator for a pulse compression radar. The transmit signal generator may include a frequency modulation stage with phase-lock-loop (PLL) circuitry configured to generate a transmit signal at antenna frequency. The transmit signal generator may include an amplitude modulation stage configured to shape an amplitude of the generated transmit signal.

21 Claims, 11 Drawing Sheets

(56) References Cited

U.S. PATENT DOCUMENTS

| | | |
|---|---|---|
| 4,353,067 A | 10/1982 | Mims |
| 4,566,010 A | 1/1986 | Collins |
| 4,626,853 A | 12/1986 | Lee et al. |
| 4,686,534 A | 8/1987 | Eddy |
| 4,707,670 A * | 11/1987 | Dakin .................... H03C 3/095 331/23 |
| 4,772,889 A | 9/1988 | Elleaume |
| 4,800,388 A | 1/1989 | Okada |
| 4,929,954 A | 5/1990 | Elleaume |
| 4,989,010 A | 1/1991 | Crevoulin et al. |
| 5,003,313 A | 3/1991 | Doriath |
| 5,128,681 A | 7/1992 | McGroary et al. |
| 5,141,308 A | 8/1992 | Danckwerth et al. |
| 5,151,702 A | 9/1992 | Urkowitz |
| 5,173,706 A | 12/1992 | Urkowitz |
| 5,309,161 A | 5/1994 | Urkowitz et al. |
| 5,389,933 A | 2/1995 | Golinsky |
| 5,414,428 A | 5/1995 | Gallagher et al. |
| 5,481,270 A | 1/1996 | Urkowitz et al. |
| 6,067,043 A | 5/2000 | Faure et al. |
| 6,377,204 B1 | 4/2002 | Wurman et al. |
| 7,019,686 B2 | 3/2006 | Hester et al. |
| 7,106,250 B2 | 9/2006 | Blunt et al. |
| 7,157,985 B2 * | 1/2007 | Mitani .................... H03C 3/095 332/119 |
| 7,675,458 B2 | 3/2010 | Hubbard et al. |
| 7,688,257 B1 | 3/2010 | Christianson et al. |
| 7,764,223 B2 | 7/2010 | Wade |
| 8,022,863 B1 | 9/2011 | Nuthalapati |
| 2002/0141510 A1 * | 10/2002 | Sridharan ............. H04L 27/361 375/300 |
| 2008/0111734 A1 | 5/2008 | Fam et al. |
| 2009/0121920 A1 | 5/2009 | Mullarkey et al. |
| 2012/0262332 A1 | 10/2012 | Ohnishi |
| 2012/0293361 A1 | 11/2012 | Mowbray et al. |

* cited by examiner

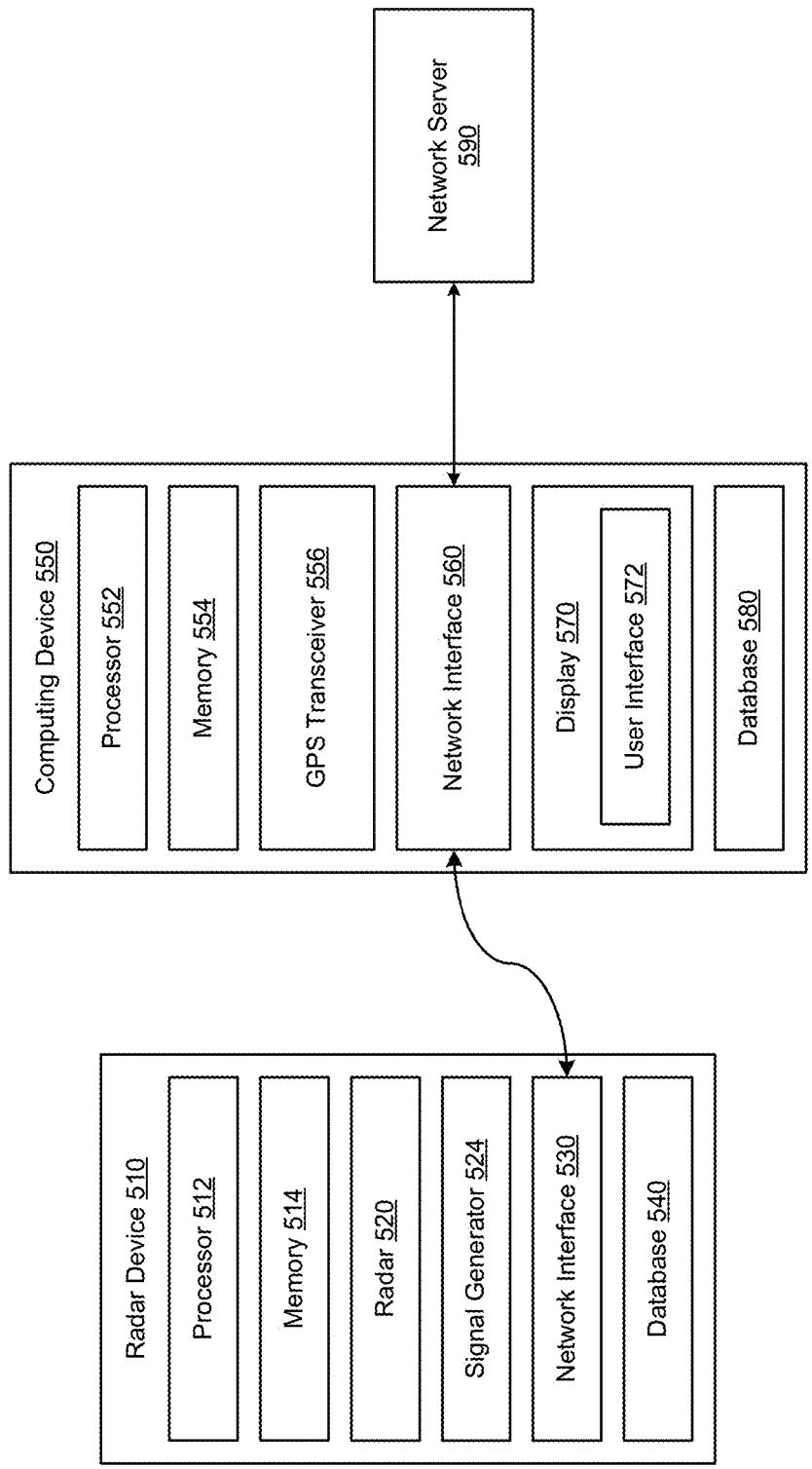

RADAR SIGNAL GENERATOR

CROSS-REFERENCE TO RELATED APPLICATIONS

This application claims the benefit of and priority to U.S. Provisional Patent Application Ser. No. 62/126,366, filed Feb. 27, 2015 and titled SIGNAL GENERATOR FOR PULSE COMPRESSION RADAR, the entire disclosure of which is incorporated herein by reference.

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Generally, radar provides marine vessels with the capability to safely navigate courses through unknown bodies of water. As such, radar is typically considered a useful tool in marine navigation by tracking neighboring vessels and obstacles in close proximity to a marine vessel. Further, radar devices may utilize technology associated with solid-state radar having improved performance against interference from other radars operating in a same frequency band, e.g., other solid-state radars or magnetron based radars.

Some conventional approaches generate a transmit signal at a low frequency and then up-convert to a transmit frequency, which typically creates unwanted cross-talk and leakage, thus causing problems and undermining radio spectrum standards. For instance, in FIG. 1, this conventional approach refers to designs with one or more up-conversions that tend to create a number of unwanted mixing product signals and local oscillator breakthrough. These unwanted signals are typically blocked with filtering, thus adding need for filter components. Further, depending on particular specifications, some filtering components typically use multiple stages, including waveguide type filters.

Moreover, the conventional approach of traditional pulse compression marine radars can be exorbitantly expensive, and these traditional marine radars systems often create unwanted mixing products each time there is a frequency conversion. Further, further problems arise in that these traditional marine radar systems can create out-of-band emissions that can fail to meet regulatory issues and standards, can be expensive for maintenance and part costs, and can typically use substantial physical space for circuitry.

SUMMARY

Described herein are implementations of technologies for an apparatus having a transmit signal generator for a radar, such as, e.g., a pulse compression radar. The transmit signal generator may include a frequency modulation stage with phase-lock-loop (PLL) circuitry configured to generate a transmit signal at antenna frequency. The transmit signal generator may include an amplitude modulation stage configured to shape an amplitude of the generated transmit signal.

Described herein are implementations of various technologies for a system having a transmit signal generator for a radar. The system may include a processor and memory having stored thereon instructions that, when executed by the processor, cause the processor to generate one or more first signals at a first frequency that is less than antenna frequency, generate one or more transmit signals at antenna frequency based on the one or more first signals using PLL circuitry, and shape amplitude of the one or more generated transmit signals prior to transmitting.

Described herein are also implementations of technologies for a transmit signal generator for a marine radar. The transmit signal generator may include first circuitry configured to generate a first signal at a first frequency that is less than antenna frequency. The transmit signal generator may include second circuitry configured to receive the first signal and generate a transmit signal at antenna frequency based on the first signal using PLL circuitry. The transmit signal generator may include third circuitry configured to shape an amplitude of the generated transmit signal prior to transmitting.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are hereafter described with reference to the accompanying drawings. It should be understood, however, that the accompanying drawings illustrate only various implementations described herein and are not meant to limit the scope of various techniques described herein.

FIG. 5 illustrates a block diagram of a transmit signal generation system in accordance with various implementations described herein.

DETAILED DESCRIPTION

Various implementations for mitigating radar interference will now be described in reference to FIGS. 2A-6.

Figure 1:
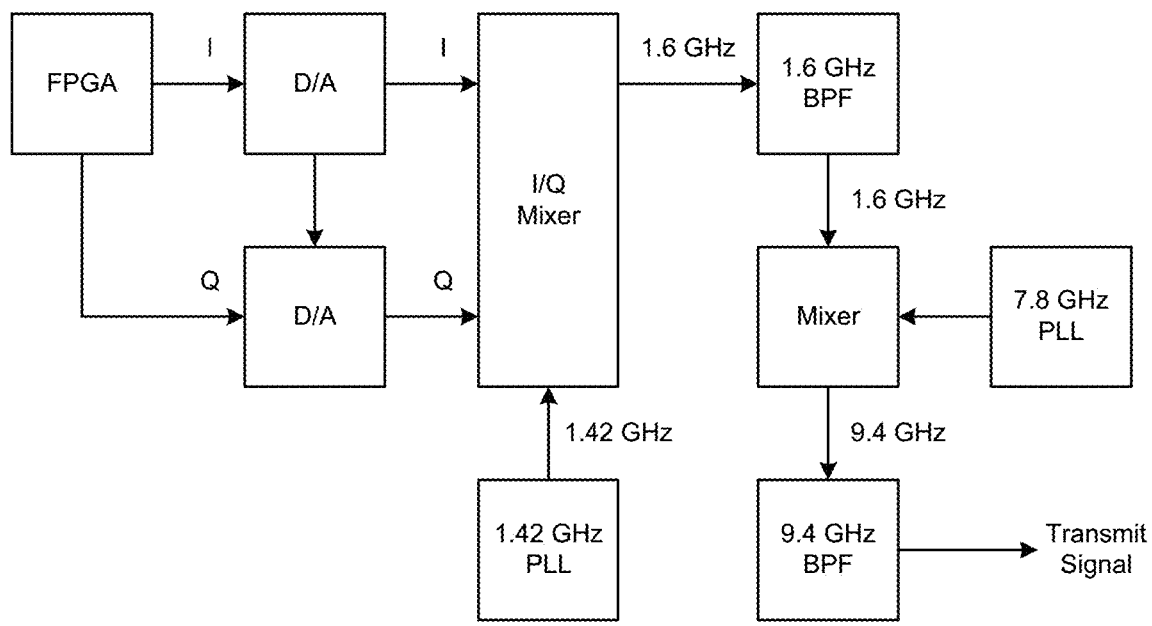
FIG. 1 illustrates a diagram of traditional circuitry as known in the art.
Figure 2A:
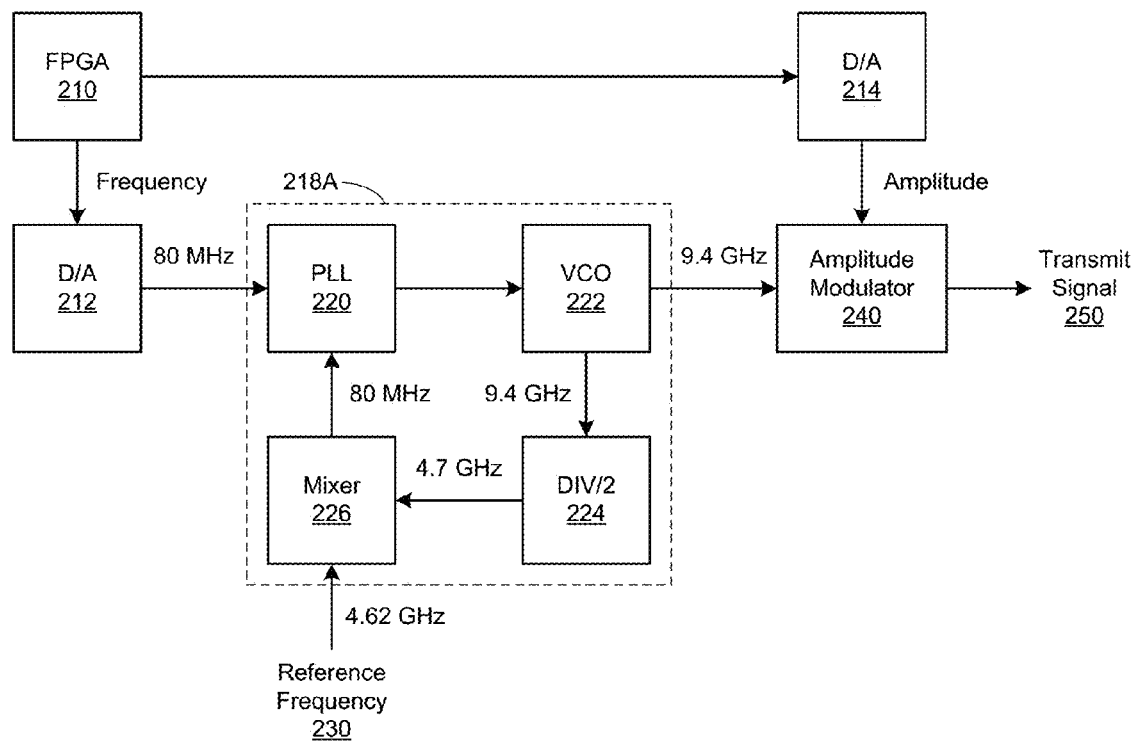
FIGS. 2A-2E illustrate various block diagrams of a transmit signal generator in accordance with various implementations described herein.
Figure 2B:
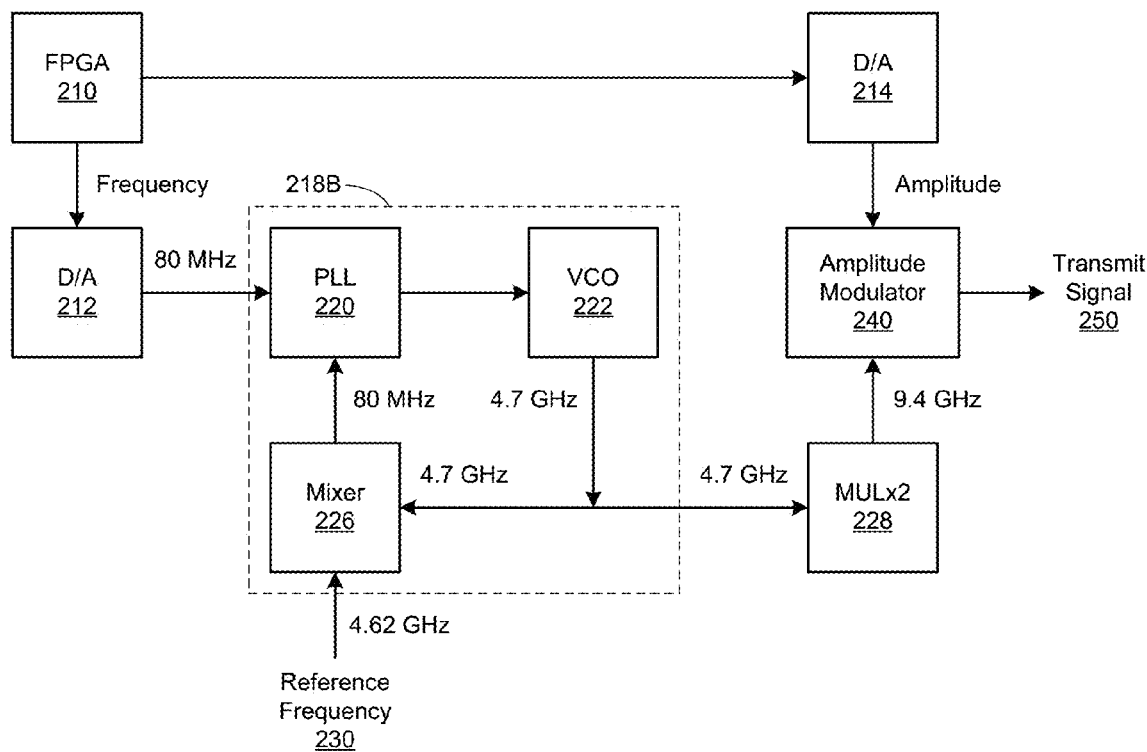
Figure 2C:
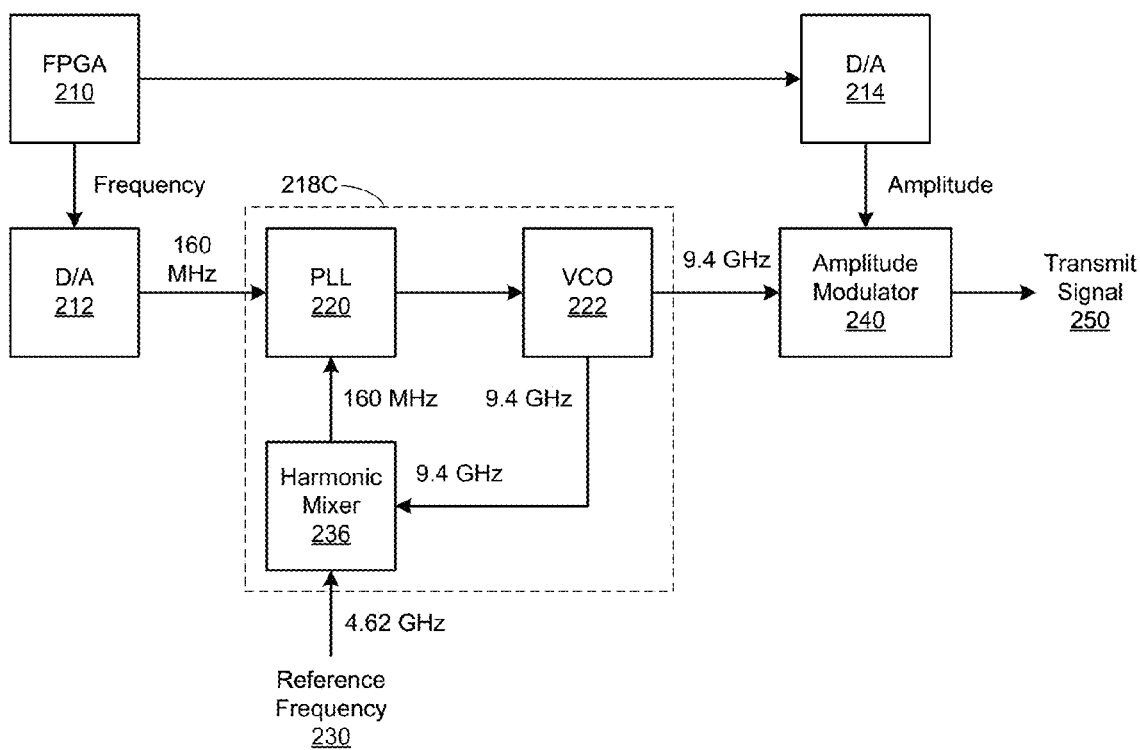
Figure 2D:
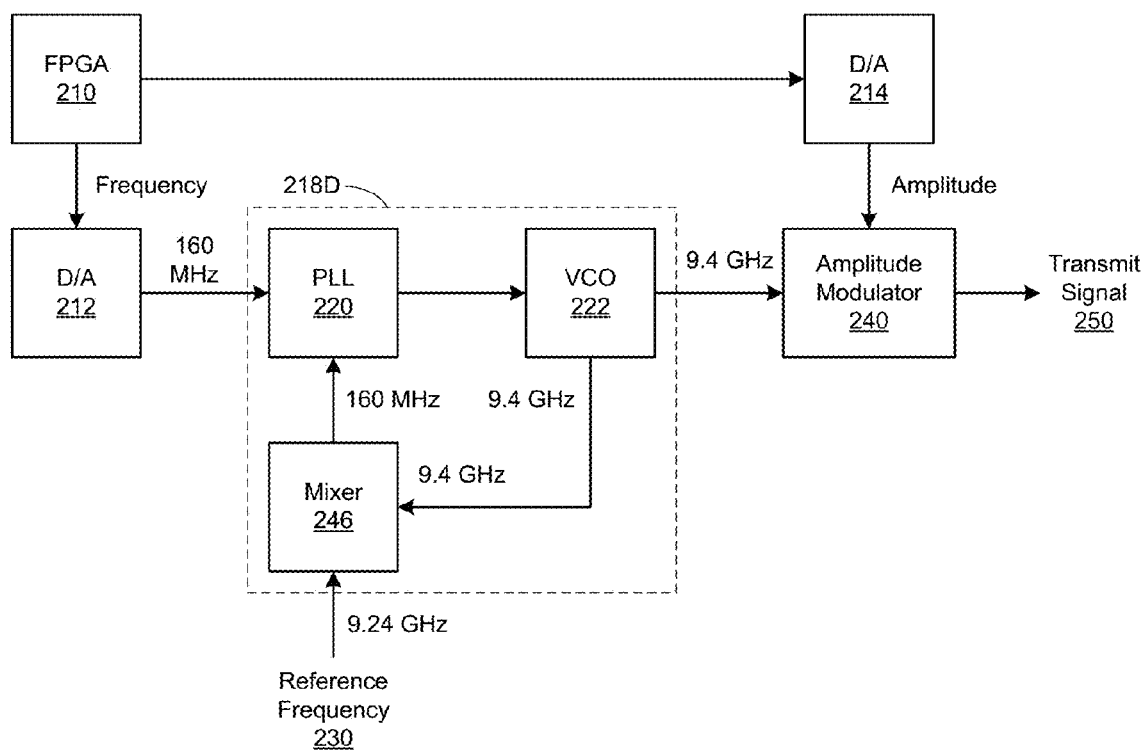
Figure 2E:
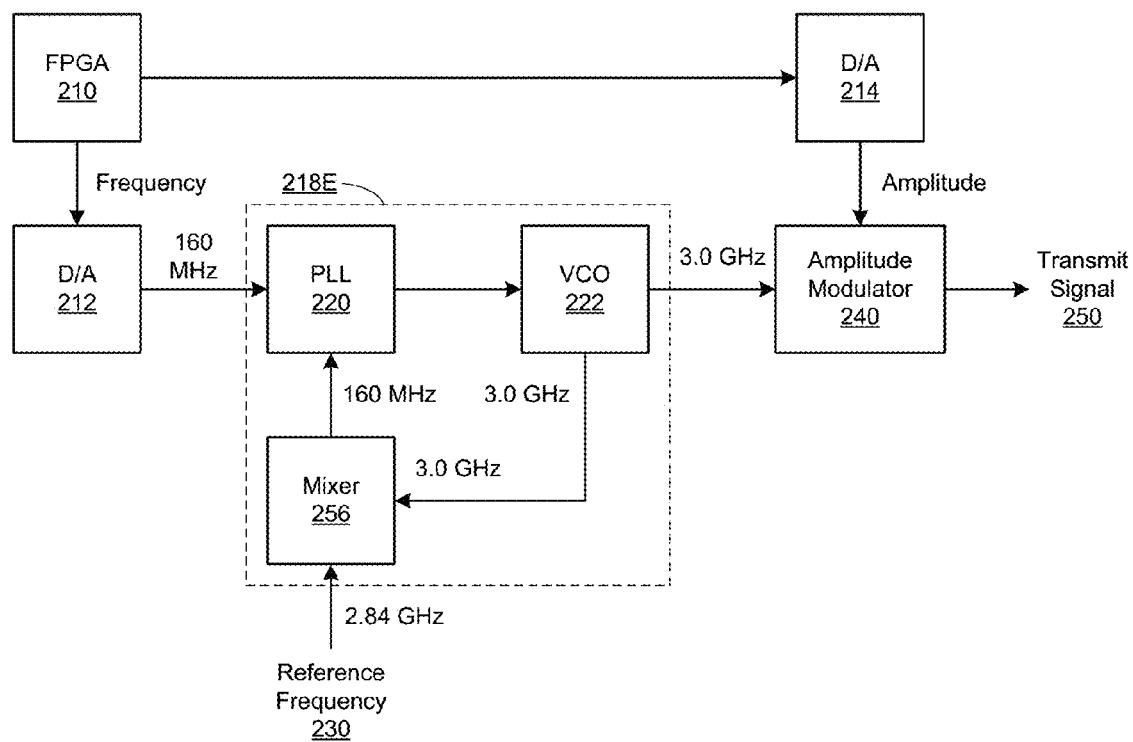

FIGS. 2A-2E illustrate various block diagrams of a transmit signal generator in accordance with various implementations described herein. In particular, FIG. 2A illustrates a block diagram of a first transmit signal generator 200A having phase-lock-loop circuitry 218A with a (PLL) module 220 and a divide-by-two module 224, FIG. 2B illustrates a block diagram of a second transmit signal generator 200B having phase-lock-loop circuitry 218B with the PLL module 220 and a multiply-by-two module 228, and FIG. 2C illustrates a block diagram of a third transmit signal generator 200C having phase-lock-loop circuitry 218C with the PLL module 220 and a harmonic mixer 236. Further, FIG. 2D illustrates a block diagram of a fourth transmit signal generator 200D having phase-lock-loop circuitry 218D with the PLL module 220 and a mixer 246, and FIG. 2E illustrates a block diagram of a fifth transmit signal generator 200E having phase-lock-loop circuitry 218E with the PLL module 220 and a mixer 256.

Referring to FIGS. 2A-2E, each of the transmit signal generators 200A-200E may be used for pulse compression radar in accordance with implementations described herein. In various instances, the term module may refer to a component, a circuit, or an integrated circuit or computer implemented method or instruction set without departing from the various implementations described herein.

In reference to FIG. 2A, the first transmit signal generator 200A may be configured to use multiple stages including a logic stage, a frequency modulation (FM) stage, and an amplitude modulation (AM) stage. In some implementations, the logic stage may include one or more components or modules, including, e.g., a logic module 210, a first digital-to-analog (D/A) converter module 212, and a second D/A converter module 212. The logic module 210 may include a field-programmable gate array (FPGA) 210 configured to generate a first signal at a first frequency, e.g., that is at least less than antenna frequency. The FPGA module 210 may be configured to provide the first signal to the frequency modulation stage via the first D/A converter module 212, and the frequency modulation stage may then in turn generate a transmit signal 250 based on the first signal using the PLL module 220, which may be referred to as a phase detector. The frequency modulation stage may include the PLL circuitry 218A (including the PLL module 220) configured to generate the transmit signal 250 at antenna frequency. In this instance, the PLL circuitry 218A (including the PLL module 220) may be configured to generate transmit signals or waveforms 250 at antenna frequency, rather than at a lower frequency and then up-converting, as in traditional systems. For instance, the VCO 222 may be configured to increase the frequency of the first signal to a higher frequency (e.g., 9.4 GHz). The amplitude modulator stage may include an amplitude modulator (or modulating, or modulation component or module) 240 configured to receive the second signal (e.g., transmit signal) at antenna frequency from the PLL circuitry 218A, receive the first signal from the FPGA module 210 via the second D/A converter module 214, and shape an amplitude of the generated transmit signal 250 (e.g., based at least in part on the first signal), in a manner as further described herein.

In some implementations, the PLL circuitry 218A may include a special-purpose control circuit configured to generate an output signal having a phase that is related to a phase of an input signal. The PLL circuitry 218A may include the PLL module 220 and the VCO module 222. The PLL module 220 may be referred to as a phase detector, and the VCO module 222 may be referred to as a variable frequency oscillator that may be configured to generate a periodic signal. The PLL 220 or phase detector may be configured to compare a phase of a reference signal (e.g., signal received from mixer 226) with a phase of the input signal (e.g., signal received from first D/A converter 212) and adjust an oscillator of the VCO module 222 to maintain a matched phase. This may be achieved by bringing an output signal (e.g., output from the VCO module 222) back toward the input signal for comparison. Further, this may be referred to as a feedback loop, because the output may be fed back toward the input, thus forming a loop or feedback loop.

Still further, maintaining input and output phases in a lock may serve to maintain or synchronize similar (or same) input and output frequencies. As such, a phase-locked loop may further be configured to track an input frequency and/or generate a frequency that may be a multiple of the input frequency.

In some implementations, as shown in reference to FIG. 2A, the phase-lock-loop (PLL) circuitry 218A may include the PLL module 220, a voltage controlled oscillator (VCO) module 222, the divide-by-two module 224, and a mixer module 226. The PLL circuitry 218A may be configured to receive the first signal from the FPGA module 210 via the first D/A converter module 212, detect a phase of the first signal with the PLL module 220, adjust the phase of the first signal with the VCO module 222, and provide a phase-adjusted first signal to the amplitude modulator 240. The divide-by-two module 224 may be configured to receive the phase-adjusted first signal from the VCO module 222, divide the frequency of the phase-adjusted first signal by two (2), and provide a divide-by-two first signal to the mixer module 226. The mixer module 226 may be configured to receive the divide-by-two first signal from the divide-by-two module 224 and receive a reference frequency signal 230 (e.g., from an external source or external circuit). Further, the mixer module 226 may be configured to mix the phase-adjusted first signal with the reference frequency signal 230 and provide a mixed signal (e.g., 80 MHz) to the PLL module 220.

In various implementations, the divide-by-two module 224 may be modified to include various divider values and/or ranges. For instance, a divider value of 1 or greater may be selected and/or used as a divisor value for the module 224. In some instances, a divider range between 2 and 10 may be selected and/or used as a range of divisor values for the module 224. Further, in some other instances, a selectably adjustable divider value range between 1 and some number greater than 1 may be selected and/or used as a range of divisor values for the module 224. Generally, a higher divider ratio may create other issues, such as, e.g., reducing phase noise of the PLL circuitry 218A and/or modifying the response.

As an example, the FPGA module 210 may be configured to generate a digital stream signal or waveform (e.g., a sine wave) at a particular frequency (e.g., 80 MHz) or within a range of frequencies (e.g., 70 MHz to 90 MHz). The generated signal may be passed through the first D/A converter 212 to generate a pulse signal at a particular frequency (e.g., 80 MHz) and then passed to the PLL module 220. Further, from the FPGA module 210, the generated signal may be passed through a second D/A converter 214 for amplification in the amplitude modulator 240, which may be referred to as an AM stage, which is described in greater detail herein.

Further, in reference to the PLL module 220, the pulse signal (e.g., at 80 MHz) may pass through a loop of the PLL module 220, the VCO module 222, the divide-by-two module 224, and the mixer module 226 to generate a higher frequency signal (e.g., 9.4 GHz). As shown in FIG. 2A, the mixer module 226 may be configured to receive the reference signal 230 (e.g., 4.62 GHz) and mix the divide-by-two signal (e.g., 4.7 MHz) with the reference signal 230 to provide a mixed signal (e.g., 80 MHz) to the PLL module 220.

In some instances, the phase-lock-loop combination of FIG. 2A may generate unwanted emissions; however, their level is low enough to pass spectrum masks. In this instance, the transmit signal generator 200A may further reduce errors in amplitude and frequency with various correction schemes. Hence, to further improve performance, the transmit signal generator 200A may be configured to modulate and/or shape the amplitude of the transmit signal, wherein as the gain of the power amplifier may not be linear, the amplitude of the transmit signal may be corrected.

FIG. 2B illustrates the second transmit signal generator 200B having an alternate PLL circuitry 218B that has the PLL module 220 and a multiply-by-two module 228. In some instances, the PLL module 220 may be configured to provide a phase-adjusted first signal to the amplitude modulator 240 via the multiply-by-two (MUL×2) module 228. The multiply-by-two module 228 may be configured to receive the phase-adjusted first signal from the VCO 222, multiply the frequency of the phase-adjusted first signal by two, and then provide a multiply-by-two first signal. Further, the mixer module 226 may be configured to receive the multiply-by-two first signal from the VCO module 222 and receive the reference frequency signal 230. The mixer module 226 may be further configured to mix the first signal with the reference signal 230 to provide a mixed signal (e.g., 80 MHz) to the PLL module 220.

In some implementations, the second transmit signal generator 200B may be configured to improve performance and reduce power consumption. In this alternate PLL circuitry 218B shown in FIG. 2B, the VCO module 222 may be configured to run at half-frequency, thus removing the frequency divider (i.e., the divide-by-two module 224, as described in reference to FIG. 2A). Further, the alternate PLL circuitry 218B may include use of a frequency doubler (i.e., the multiply-by-two or MUL×2 module 228) to bring the VCO frequency of 4.7 GHz to 9.4 GHz. As further shown in FIG. 2B, the higher frequency signal or second signal (e.g., 9.4 GHz) may be provided to the amplitude modulator 240 via the multiply-by-two module 228.

FIG. 2C illustrates the third transmit signal generator 200C having yet another PLL circuitry 218C that has the PLL module 220 and a harmonic mixer 236. In some instances, the PLL module 220 may be configured to provide a phase-adjusted first signal to the amplitude modulator 240 via the VCO 222. Further, the harmonic mixer 236 may be configured to receive the first signal from the VCO 222 and receive the reference frequency signal 230. The harmonic mixer 236 may be configured to mix the first signal with the reference signal 230 to provide a mixed signal (e.g., 160 MHz) to the PLL module 220.

In this alternate PLL circuitry, the phase-lock-loop circuitry 218C uses the harmonic mixer 236 to increase the PLL internal frequency (IF) to 160 MHz. Further, the third transmit signal generator 200C may include use of a higher frequency (e.g., 160 MHz) generated by the first D/A converter 212. In some instances, one strategy for using this option may be to improve response time of the PLL circuitry and to improve accuracy of frequency modulation. Further, this third option may be used if the frequency deviation becomes substantially high and thus creates an unacceptable level of range sidelobe(s). Still further, this third option may be used if the frequency error is reducible or may be reduced by forward correction.

FIG. 2D illustrates the fourth transmit signal generator 200D having still another PLL circuitry 218D that has the PLL module 220 and the mixer 246. In this alternate PLL circuitry, the phase-lock-loop circuitry 218D uses the mixer 246 to increase the PLL internal frequency (IF) to 160 MHz. and the reference frequency 230 may be doubled to ~9.24 GHz. Further, the fourth transmit signal generator 200D may include use of a higher frequency (e.g., 160 MHz) generated by the first D/A converter 212. As with the third transmit signal generator 200C, this option may be used to improve response time of the PLL circuitry and to improve accuracy of frequency modulation. Further, this fourth option may be used if the frequency deviation becomes high and creates an unacceptable level of range sidelobe(s). Still further, this fourth option may be used if the frequency error is reducible by forward correction.

FIG. 2E illustrates the fifth transmit signal generator 200E having yet another PLL circuitry 218E that has the PLL module 220 and the mixer 256. In this alternate PLL circuitry, the phase-lock-loop circuitry 218E uses the mixer 256 to increase the PLL internal frequency (IF) to 160 MHz, and the reference frequency 230 may be halved to ~2.84 GHz. Further, the fourth transmit signal generator 200D may include use of a higher frequency (e.g., 160 MHz) generated by the first D/A converter 212. In some implementations, this fifth option may be used in an S-band radar for ~3 GHz. In this instance, this fifth option may not use doublers or dividers, and this fifth option may use a 160 MHz PLL internal frequency (IF). Further, when using this fifth option, the phase-lock-loop circuitry 218E may not run at 160 MHz. Instead, an internal divider inside the phase-lock-loop module 220 may halve a phase frequency detector (PFD) frequency to 80 MHz. In some instances, when using this fifth option, the input from the first D/A converter 212 may be ~80 MHz, and the input from the mixer 256 (e.g., a down-converter mixer) may be ~160 MHz. In any event, this fifth option may be used to improve response time of the PLL circuitry and to improve accuracy of frequency modulation.

Figure 3A:
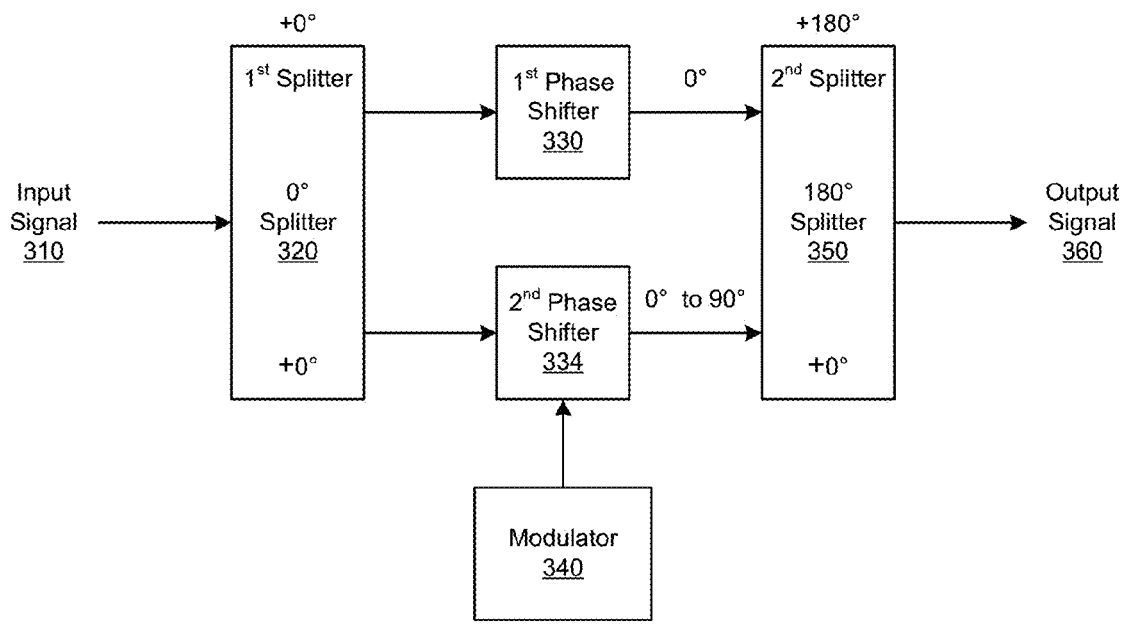
FIGS. 3A-3B illustrate various block diagrams of an amplitude modulator in accordance with various implementations described herein.
Figure 3B:
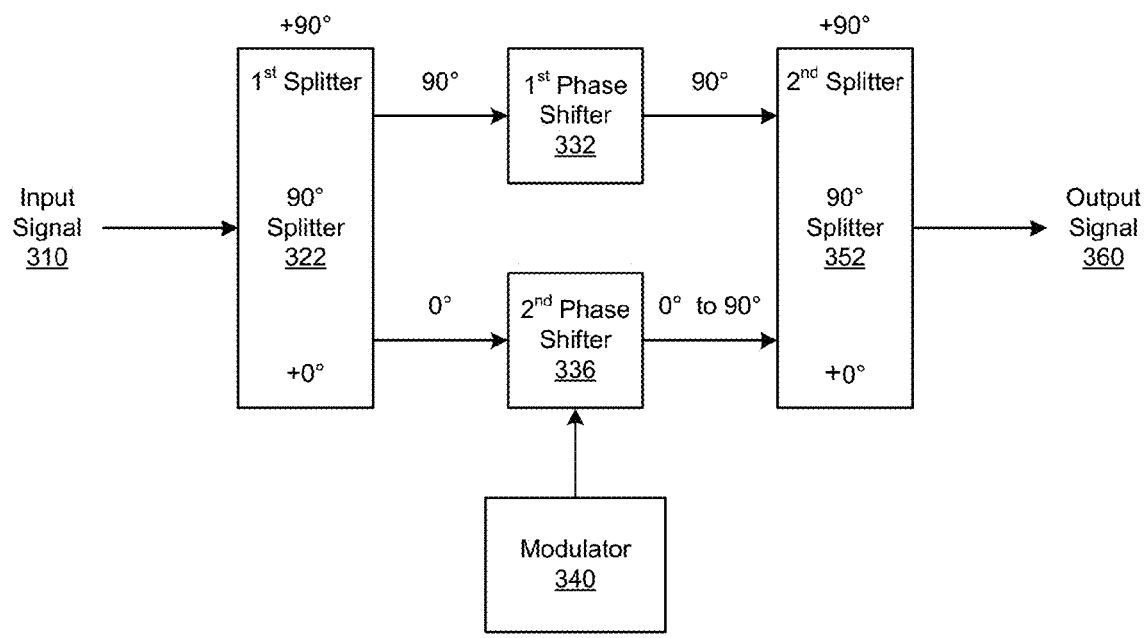

FIGS. 3A-3B illustrate various block diagrams of an amplitude modulator in accordance with various implementations described herein. In particular, FIG. 3A illustrates a diagram of a first amplitude modulator 300A having a first splitter (e.g., 0° splitter 320), a first phase shifter 330, a second phase shifter 334, and a second splitter (e.g., 180° splitter 350). FIG. 3B illustrates another diagram of a second amplitude modulator 300B having a first splitter (e.g., first 90° splitter 322), a first phase shifter 332, a second phase shifter 336, and a second splitter (e.g., second 90° splitter 352).

In reference to FIGS. 3A-3B, the amplitude modulators 300A, 300B may refer to implementations of the amplitude modulator 240 of FIGS. 2A-2C. For instance, the signal generated by FPGA module 210 may be passed through the first D/A converter 212 to generate a pulse signal at a particular frequency (e.g., 80 MHz), and then passed to the amplitude modulator 240 via the PLL circuitry as a higher frequency signal (e.g., 9.4 GHz). In this instance, this higher frequency signal (e.g., 9.4 GHz) may be represented as an input signal 310 in FIGS. 3A-3B. Further, the signal generated by FPGA module 210 may be passed through the second D/A converter 214 for amplification by the amplitude modulator 240. In this instance, this amplified signal may be represented by a signal passed from a modulator 340 of amplitude modulators 300A, 300B in FIGS. 3A-3B.

Referring to FIGS. 3A-3B, transmit signal generation may include a stage for analog control of signal amplitude, such as, e.g., the amplitude modulator 340. In some implementations, usual variable attenuators may be based on PIN diodes, which may be significantly slow (e.g., >1 µs) to allow for amplitude shaping of pulse compression pulses by, e.g., the amplitude modulator 340. Generally, a PIN diode includes a type of diode having a wide, un-doped intrinsic semiconductor region between a p-type semiconductor region and an n-type semiconductor region. In some instances, these p-type and n-type semiconductor regions may be heavily doped for use as ohmic contacts. As such, the wide, un-doped intrinsic region of the PIN diode allows the PIN diode to operate as an inferior rectifier, which allows for suitable use of the PIN diode as an attenuator. Further, varactor or varicap diodes may be used as attenuators due to their capability to change capacity with a change of control voltage. In some instances, with use of varactor or varicap diodes, there may be little or no first order latencies, such as, e.g., a carrier lifetime of PIN diodes.

The amplitude modulator 300A of FIG. 3A may be configured to receive the input signal 310 and provide the output signal 360. The 0° splitter 320 (first splitter) may be configured to provide a 0° phase shift. The first phase shifter 330 may be configured to provide a 0° phase shift. The second phase shifter 334 may be configured to provide a 0° to 90° phase shift. The 180° splitter 350 (second splitter) may be configured to provide the output signal 360. In some instances, the 0° splitter 320 may be configured to receive the transmit signal as input 310 and provide split signals to each of the first and second phase shifters 330, 334. The first phase shifter 330 may be configured to receive one of the split signals and provide a 0° phase shifted signal to the 180° splitter 350. The second phase shifter 334 may be configured to receive another one of the split signals, receive an amplified first signal from, e.g., the amplitude modulator 340, and provide a 0° to 90° phase shifted signal to the 180° splitter 350 combined with the amplified first signal. Further, the 180° splitter 350 may be configured to receive the 0° phase shifted signal, receive the 0° to 90° phase shifted signal combined with the amplified first signal, and provide the transmit signal as the output signal 360.

In some implementations, the first amplitude modulator 300A of FIG. 3A may be referred to as an analog shaping amplitude modulator, and in this instance, the first amplitude modulator 300A may be configured to provide a circuit using a 0° and 180° splitter/combiner technique. As shown in FIG. 3A, if two (2) similar or identical phase shifters 330, 334 are fed with a same signal and combined in anti-phase, their insertion loss may be in an order of, e.g., 25 to 30 dB (decibels). If one of the phase shifters (e.g., second phase shifter 334) is modulated so its phase changes in an order of, e.g., 0° to 90°, the insertion loss may decrease down to an order of, e.g., 6 to 8 dB. Further, in some instances, the phase shifters 330, 334 may have no significant latency, and as such, a change in insertion loss may be achieved in <20 ns and may be restrained by an analog drive circuit. Still further, depending on the type of varicap or varactor diodes used, insertion loss may follow an approximate linear function. As such, in some implementations, the circuit may be considered linear and may be stacked to achieve a modulation level in a range of 40 or 60 dB. In comparison, vector multipliers (i.e., mixers) may be configured to use a particular input level to drive the circuit, which may not use stacking to achieve a greater modulation level.

In reference to FIGS. 2A, 2B, and 3A, the amplitude modulator stage may include an amplitude modulator 240, 340 (i.e., amplitude modulator or amplitude modulating component) configured to provide a high-speed amplification of the generated signal passed from the FPGA module 210 via the second D/A converter 214. In some implementations, this amplification may include an analog amplification from a range of 0V-2V to a range of 0V-26V. Further, the rise time of the high-speed amplification may be in an order of ~10 nano-seconds. Still further, the amplitude modulator may include an electrical circuit having, e.g., driving varicap or varactor diodes that provide a direct-current (DC) pulse as an output to one or more of the phase shifters.

FIG. 3B illustrates a diagram of another analog shaping amplitude modulator, in accordance with various implementations described herein. In some implementations, the diagram of FIG. 3B provides an alternate circuit that uses an optional configuration, e.g., of a two (2) 90° hybrid splitters/combiners technique, instead of using the previous 0° and 180° splitter/combiner technique, as shown in FIG. 3A.

In reference to FIG. 3B, the amplitude modulator stage may include a similar amplitude modulator 340, as described in reference to FIG. 3A. The amplitude modulator 300B of FIG. 3B may be configured to receive the input signal 310 and provide the output signal 360. The first 90° splitter 322 may be configured to provide a 0° to 90° phase shift. The first phase shifter 332 may be configured to provide a 90° phase shift. The second phase shifter 336 may be configured to provide a 0° to 90° phase shift. The second 90° splitter 352 may be configured to provide the output signal 360. In some instances, the first 90° splitter 322 may be configured to receive the transmit signal as input 310 and provide split signals to each of the first and second phase shifters 332, 336. The first phase shifter 332 may be configured to receive one of the split signals and provide a 90° phase shifted signal to the second 90° splitter 352. The second phase shifter 336 may be configured to receive another one of the split signals, receive an amplified first signal from, e.g., the amplitude modulator 340, and provide a 0° to 90° phase shifted signal to the second 90° splitter 352 combined with the amplified first signal. Further, the second 90° splitter 352 may be configured to receive the 90° phase shifted signal, receive the 0° to 90° phase shifted signal combined with the amplified first signal, and provide the transmit signal as the output signal 360.

The various implementations described herein provide for low-medium power frequency swept interweaved pulse burst transmissions for various pulse compression radar applications. Further, the various implementations described herein provide for substantially coherent and clean transmissions, where emissions may remain within an allocated spectrum. Still further, the various implementations described herein provide for interoperability with conventional pulse radars on a same marine vessel.

Figure 4A:
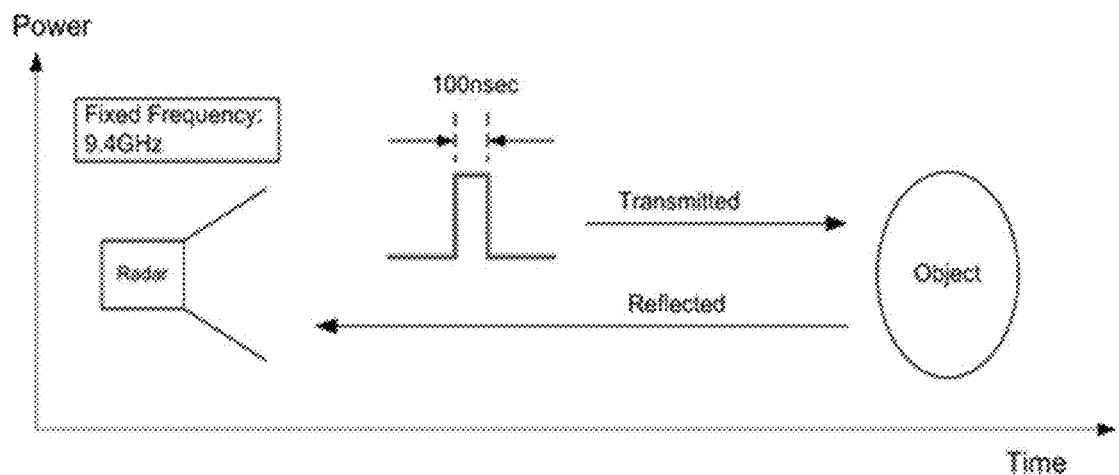
FIGS. 4A-4B illustrate various diagrams of transmit signals or waveforms in accordance with various implementations described herein.
Figure 4B:
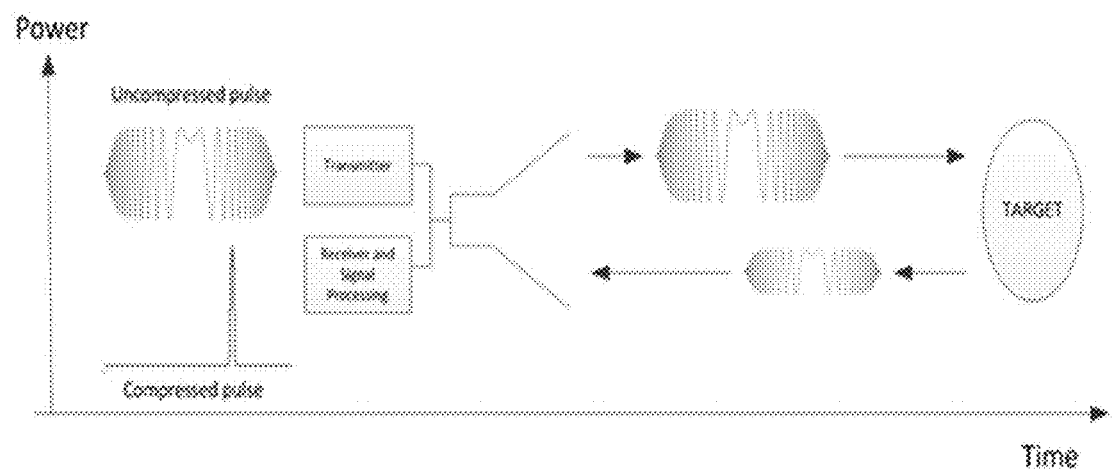

FIGS. 4A-4B illustrate various diagrams of transmit signals or waveforms in accordance with various implementations described herein. In some implementations, a pulse compression radar may use technology related to solid-state radar having improved performance against interference from other radars operating in a same frequency band, e.g., whether other solid-state radars or magnetron based radars.

In reference to FIG. 4A, a radar may be configured to transmit a powerful, but substantially short pulse, at fixed frequency. The pulse may propagate outward in a direction determined by an angle of a rotating radar antenna at time of transmission. The radar may switch to a receive mode to listen for reflections. In some instances, if the pulse reflects off of an object, the pulse may return to the receiver with a delay proportional to a distance of the object from the transmitter. Further, in some instances, the antenna angle at the time of pulse transmission may equal the direction of the object.

In reference to FIG. 4B, a radar may be configured to transmit a chirp signal that is transmitted to propagate outward with direction according to an angle of a rotating radar antenna at time of transmission. Further, the radar may switch to a receive mode to listen for echoes. In some instances, if the chirp reflects off of a target object, the echo may return to the receiver with a time delay proportional to a distance of the target object from the transmitter. Further, the pulse compression technique may refer to a chirp that is compressed into a pulse up to many times shorter (e.g., 150 times shorter) using signal processing techniques. In some instances, time delay may be measured to determine a range of a target object, and antenna angle at the time of pulse transmission may equal a direction of the target object.

FIG. 5 illustrates a block diagram of a transmit signal generation system 500 in accordance with various implementations described herein.

In reference to FIG. 5, the transmit signal generation system 500 may include a radar device 510 having at least one radar component 520, a computing device 550, and a network server 590. The radar device 510 may be configured to generate radar data and information using the at least one radar component 520. The radar device 510 may be configured to transmit or upload radar data and information to the computing device 550 via a wired or wireless network. The computing device 550 may be a marine electronics device or multi-function display (MFD) configured for interfacing with the radar device 510 and/or the at least one radar component 520. Further, computing device 550 may be configured to transmit or upload the radar data and information received from the radar device 510 to the network server 590 via a wired or wireless network.

The radar device 510 may be used for marine based navigation and may be positioned (or coupled or mounted) to a marine based vessel, such as, e.g., watercraft, boat, ship, etc.). The radar device 510 may be configured to generate radar data and information related to targets on a body of water (e.g., ocean, sea, gulf, river, lake, etc.) using the at least one radar component 520. The radar device 510 may be configured to detect and track targets and/or objects using radar signals (e.g., radio frequency waves) with the at least one radar component 520, while assisting a marine vessel in avoiding obstacles or making course for a specific target. The radar device 510 may be configured to determine one or more characteristics of a target and/or object, including at least one of speed, direction, range, and altitude of the target and/or object. In some instances, a network connection may be used and include various cables for supplying power from a marine vessel to the radar device 510 and for transmitting data and information to and from various instruments on the marine vessel.

The radar device 510 may include at least one processor 512 and memory 514 having instructions that cause the processor 512 to record, store, and log radar data and information received from the radar component 520 in one or more databases, such as, e.g., database 540. The radar device 510 may include the network interface 530, and the memory 514 may include instructions that cause the processor 512 to transmit radar data and information generated by the at least one radar component 520 and/or recorded by the processor 512. The network interface 530 may include a transmitter or transceiver configured to transmit radar data to the computing device 550. As described herein, transmission of radar data between the radar device 510 and the computing device 550 may occur via a network connection. In some instances, transmission of radar data may occur in response to detecting a network, such as a wired or wireless network.

Further, the radar device 510 may include a transmit signal generator 524, which may be referred to as a signal generator. In accordance with various implementations described herein, the signal generator 524 may be configured to generate and transmit signals for a radar, such as, e.g., a pulse compression radar. For instance, the signal generator 524 may be configured to generate one or more first signals at a first frequency that is less than antenna frequency, generate one or more transmit signals at antenna frequency based on the one or more first signals using a phase-lock-loop (PLL), and further shape amplitude of the one or more generated transmit signals prior to transmitting. These and other implementations related to transmit signal generation have been described in greater detail herein.

The radar device 510 may use pulse compression to implement wave shaping processes to propagate frequency modulated pulse signals or waveforms. Such technology may be used to resolve targets having overlapping returns and may allow for amplifying transmitted peak power by temporal compression. Further, pulse compression may be associated with a signal processing technique used in radar to increase range resolution and signal-to-noise ratio (SNR). Sometimes, pulse compression techniques may be implemented by modulating a transmitted pulse and correlating a received signal with the transmitted pulse.

The radar device 510 may include various other components, such as, e.g., an antenna and a power supply. For instance, the antenna may be used to communicate wirelessly with the computing device 550, and the power supply may be used to power various components of the radar system 510, such as, e.g., radar component 520.

The radar component 520 may include various other radar related components, such as, e.g., signal processor, transmitter for sending radar signals through an antenna, receiver for receiving radar signals from an antenna, voltage oscillator, amplifier for radar signals received by an antenna, one or more filters to block frequency bands of signals received by an antenna, and/or other similar radar components for receiving, transmitting, processing, and/or analyzing radar signals or waveforms.

The computing device 550 may be configured to receive radar data and related information from the radar device 510 over a network via a network interface 560. The computing device 550 may include at least one processor 552 and memory 554 having instructions that cause the processor 552 to receive the radar data and/or display images associated with the radar data on a display component or device 570. The computing device 550 may be configured to create/generate radar data logs associated with the radar data. The computing device 550 may be configured to store, record, and/or log the radar data and/or radar data logs in one or more databases (e.g., database 580). Further, the computing device 550 may be configured to upload the radar data and/or sonar logs to the network server 590, such as, e.g., a cloud server or various other types of network servers, via the network interface 560.

The computing device 550 may be configured to record and store multiple radar data logs and create/generate one or more radar data maps of targets and/or objects on a body of water therefrom. For instance, the computing device 550 may be configured to create/generate one or more maps by stitching, combining, and/or joining multiple radar data logs together. Further, the computing device 550 may be configured to receive geo-coordinate data, such as global positioning system (GPS) data, via a GPS transceiver 558 and associate the received GPS data to the radar data, radar data logs, and/or radar data maps at any time, including prior to upload to the network server 590.

In various implementations, the computing device 550 may be configured as a special purpose machine for interfacing with the radar device 510 having the at least one radar component 520. Further, the computing device 550 may include various standard elements and/or components, including power, peripherals, and various other computing components that may not be specifically shown in FIG. 5. Further, the computing device 550 may include the display device 570 (e.g., a monitor or other computer display) that may be used to provide a user interface (UI) 572, including a graphical user interface (GUI). In FIG. 5, the display 570 is shown as an incorporated part of the computing device 550; however, the display 570 may be implemented as a separate component. Further, the UI 572 may be used to receive one or more preferences from a user of the display device 570 for managing or utilizing the transmit signal generation system 500, including interfacing with the radar device 510 and the at least one radar component 520. As such, a user may setup desired behavior of the system 500 and/or the radar component 520 via user-selected preferences using the UI 572 associated with the display device 570. Various elements and/or components of the system 500 that may be useful for the purpose of implementing the system 500 may be added, included, and/or interchanged, in manner as described herein.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in the context of marine electronics and systems therefor, such as devices found in marine vessels and/or navigation systems. Further, ship instruments and equipment may be connected to computing systems described herein for executing navigation technologies, as described herein. Still further, the computing systems may be configured to operate using various radio frequency technologies and implementations, such as sonar, radar, GPS, and other similar technologies.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Marine Electronics Device

Figure 6:
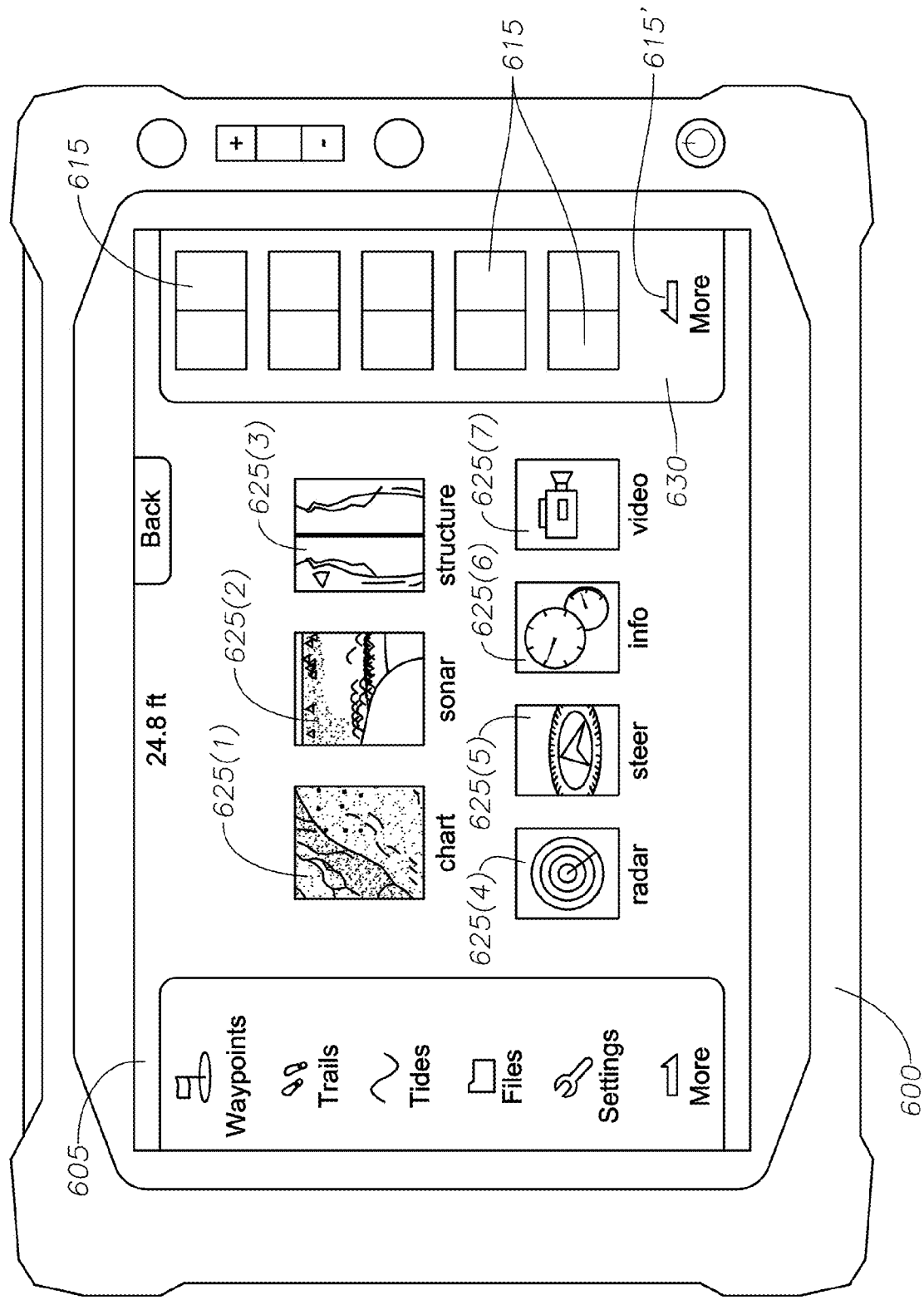
FIG. 6 illustrates a schematic of a marine electronics device in accordance with various implementations described herein.

FIG. 6 illustrates a schematic of a marine electronics device in accordance with various implementations described herein.

FIG. 6 illustrates a schematic diagram of the marine electronics device 600 in accordance with various implementations described herein. In some implementations, the marine electronics device 600 includes the scope and functionality of the computing device 550 of FIG. 5. The marine electronics device 600 may include a display device, such as a multi-function display (MFD) or similar marine display, having a screen 610 with a graphical user interface (GUI) 605. The GUI 605 may be configured to process and send commands and/or instructions to the radar device 510 of FIG. 5, and these commands and/or instructions may be used to interface with the radar component 520 of the radar device 510. Further, the GUI 605 may display radar data and information to a user, and the GUI 605 may provide various icons 635 to control the radar settings.

Further, the GUI 605 may provide a selection of marine electronics data types for display in accordance with marine based navigation. The different marine electronics data types may be presented by icons 625. The icons may include an icon for chart data type 625(1), sonar data type 625(2), structure data type 625(3), radar data type 625(4), steering data type 625(5), dashboard information type 625(6), and video 625(7). In some implementations, the screen 610 may be sensitive to touch by a human finger, and/or the screen 610 may be sensitive to body heat from a finger, a stylus, or responsive to a mouse. As further shown, the marine electronics device 600 may include a plurality of buttons 620, which may include physical buttons and/or virtual buttons, or some combination thereof.

The chart data type icon 625(1) may be configured for displaying a local map of a region surrounding the location of the marine electronics device 600. Where the marine electronics device 600 is carried over a body of water by a vessel, the sonar data type icon 625(2) may be configured for displaying sonar data from the body of water surrounding the vessel. The structure data type icon 625(3) may be configured for providing a higher resolution image covering a wider area of the body of water surrounding the vessel. The radar data type icon 625(4) may be configured for providing a radar view of the area surrounding the marine electronics device 600. The steering data type icon 625(5) may be configured for displaying information, such as distance to destination, speed over ground, and time to destination. The dashboard data type icon 625(6) may be configured for displaying an instrument panel for a vessel carrying the marine electronics device 600. The instrument panel may include measurement meters that provide information such as, for example, bearing, speed, fuel level, and oil level.

Additionally, the screen 610 may display a side tray 630 of additional options 615. Among the additional options 615 may be an option 615' for more additional options. In some instances, selection of option 615' may provide and/or display another tray menu that includes an option for customizing the display.

In various implementations, the marine electronics device 600 may be attached to various buses and/or networks, such as, e.g., a National Marine Electronics Association (NMEA) bus or network. The marine electronics device 600 may send or receive data to or from another device attached to the NMEA 2000 bus. For instance, the marine electronics device 600 may transmit commands and receive data from a motor or a sensor using an NMEA 2000 bus. In some implementations, the marine electronics device 600 may be capable of steering a vessel and controlling the speed of the vessel, i.e., autopilot. For instance, one or more waypoints may be input to the marine electronics device 600, and the marine electronics device 600 may be configured to steer the vessel to the one or more waypoints. Further, the marine electronics device 600 may be configured to transmit and/or receive NMEA 2000 compliant messages, messages in a proprietary format that do not interfere with NMEA 2000 compliant messages or devices, and/or messages in any other format. In various other implementations, the marine electronics device 400 may be attached to various other communication buses and/or networks configured to use various other types of protocols that may be accessed via, e.g., NMEA 2000, NMEA 0183, Ethernet, Proprietary wired protocol, etc.

The marine electronics device 600 may be operational with numerous general purpose or special purpose computing system environments and/or configurations. The marine electronics device 600 may include any type of electrical and/or electronics device capable of processing data (including, e.g., various environmental sensor type data) and information via a computing system. The marine electronics device 600 may include various marine instruments, such that the marine electronics device 600 may use the computing system to display and/or process the one or more types of marine electronics data. The device 600 may display marine electronic data, such as, e.g., radar data and images associated with radar data. As described herein, the marine electronic data types may include chart data, radar data, sonar data, steering data, dashboard data, navigation data, fishing data, engine data, and various other similar data.

The marine electronics device 600 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. Further, the GPU may generate user interfaces (UIs) including graphical user interfaces (GUIs) that provide, present, and/or display the output data. The GPU may also provide objects, such as menus, in the GUI. In some instances, a user may provide input by interacting with objects, and the GPU may receive input from interaction with objects and provide the received input to the CPU. Further, in some instances, a video adapter may be provided to convert graphical data into signals for a monitor, such as, e.g., MFD 600.

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™' technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Some implementations may be configured for connection to a GPS receiver system and/or a marine electronics device or system. The GPS system and/or marine electronics device or system may be connected via a network interface. For instance, the GPS receiver system may be used to determine position data for the vessel on which the marine electronics device 600 is disposed. Further, the GPS receiver system may be configured to transmit geo-position data to the marine electronics device 600. In other instances, any positioning system known to those skilled in the art may be used to determine and/or provide the position data for the marine electronics device 600.

In various implementations, the marine electronics device or system may include one or more components disposed at various locations on a vessel. Such components may include one or more data modules, sensors, instrumentation, and/or any other devices known to those skilled in the art that may transmit various types of data to the marine electronics device 600 for processing and/or display. The various types of data transmitted to the marine electronics device 600 may include marine electronics data and/or other data types known to those skilled in the art. The marine electronics data received from the marine electronics device or system may include chart data, sonar data, structure data, radar data, navigation data, position data, heading data, automatic identification system (AIS) data, Doppler data, speed data, course data, or any other type known to those skilled in the art.

In one implementation, the marine electronics device or system may include a radar sensor for recording the radar data and/or the Doppler data, a compass heading sensor for recording the heading data, and a position sensor for recording the position data. In a further implementation, the marine electronics device or system may include a sonar transducer for recording the sonar data, an AIS transponder for recording the AIS data, a paddlewheel sensor for recording the speed data, and/or the like.

The marine electronics device 600 may receive external data via a LAN or a WAN. In some implementations, external data may relate to information not available from various marine electronics systems. The external data may be retrieved from the Internet or any other source. The external data may include atmospheric temperature, atmospheric pressure, tidal data, weather, temperature, moon phase, sunrise, sunset, water levels, historic fishing data, and/or various other fishing data.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. An apparatus, the apparatus comprising:
    a transmit signal generator for a pulse compression radar, having:
        a frequency modulation stage with phase-lock-loop (PLL) circuitry configured to generate a transmit signal at an antenna transmission frequency; and
        an amplitude modulation stage configured to shape an amplitude of the generated transmit signal at the antenna transmission frequency by:
            splitting the transmit signal into at least a first split signal and a second split signal;
            providing a first phase shift of the first split signal;
            providing a second phase shift of the second split signal; and
            combining the first phase shifted split signal and the second phase shifted split signal to provide an output signal corresponding to the transmit signal.

2. The apparatus of claim 1, further comprising:
    a logic circuit configured to generate a first signal at a first frequency that is less than the antenna transmission frequency,
    wherein the logic circuit provides the first signal to the frequency modulation stage, and wherein the frequency modulation stage receives the first signal and generates the transmit signal based on the first signal via the PLL circuitry.

3. The apparatus of claim 2, wherein the logic circuit comprises a field-programmable gate array (FPGA).

4. The apparatus of claim 2, wherein the PLL circuitry is configured to receive the first signal, detect a phase of the first signal with a PLL module, adjust the phase of the first signal with a voltage controlled oscillator (VCO), and provide a phase-adjusted first signal.

5. The apparatus of claim 4, wherein, the PLL circuitry comprises:
    a divide-by-two circuit configured to receive the phase-adjusted first signal from the VCO, divide the frequency of the phase-adjusted first signal by two, and provide a divide-by-two first signal; and
    a mixer configured to receive the divide-by-two first signal from the divide-by-two circuit, receive a reference signal, and mix the first signal with the reference signal to provide a frequency-adjusted first signal to the PLL module.

6. The apparatus of claim 4, wherein the PLL circuitry comprises:
    a multiply-by-two circuit configured to receive the phase-adjusted first signal from the VCO, multiply the frequency of the phase-adjusted first signal by two, and provide a multiply-by-two first signal; and
    a mixer configured to receive the multiply-by-two first signal from the VCO, receive a reference signal, and mix the multiply-by-two first signal with the reference signal to provide a frequency-adjusted first signal to the PLL module.

7. The apparatus of claim 4, wherein the PLL circuitry comprises:
    a harmonic mixer configured to receive the phase-adjusted first signal from the VCO, receive a reference signal, and mix the phase-adjusted first signal with the reference signal to provide a frequency-adjusted first signal to the PLL module.

8. The apparatus of claim 1, wherein the amplitude modulation stage comprises:
    an amplitude modulator;
    a 0° splitter;
    a first phase shifter configured to provide a 0° phase shift;
    a second phase shifter configured to provide a 0° to 90° phase shift; and
    a 180° splitter.

9. The apparatus of claim 8, wherein the amplitude modulator is configured to receive the transmit signal, provide a high-speed amplification of the transmit signal, and generate an amplified transmit signal;
    wherein splitting the transmit signal comprises the 0° splitter receiving the transmit signal as input and providing the first split signal to the first phase shifter and the second split signal to the second phase shifter,
    wherein providing the first phase shift of the first split signal comprises the first phase shifter receiving the first split signal and providing a 0° phase shifted signal to the 180° splitter,
    wherein providing the second phase shift of the second signal comprises the second phase shifter receiving the second split signal, receiving the amplified transmit signal from the amplitude modulator, and providing a 0° to 90° phase shifted signal to the 180° splitter combined with the amplified transmit signal, and
    wherein combining the first phase shifted split signal and the second phase shifted split signal to provide the output signal comprises the 180° splitter receiving the 0° phase shifted signal, receiving the 0° to 90° phase shifted signal combined with the amplified transmit signal, and providing the amplified transmit signal as the output signal.

10. The apparatus of claim 1, wherein the amplitude modulation stage comprises:
an amplitude modulator;
a first 90° splitter;
a first phase shifter configured to provide a 90° phase shift;
a second phase shifter configured to provide a 0° to 90° phase shift; and
a second 90° splitter.

11. The apparatus of claim 10, wherein the amplitude modulator is configured to receive the transmit signal, provide a high-speed amplification of the transmit signal, and generate an amplified transmit signal;
wherein splitting the transmit signal comprises the first 90° splitter receiving the transmit signal as input and providing the first split signal to the first phase shifter and the second split signal to the second phase shifter,
wherein providing the first phase shift of the first split signal comprises the first phase shifter receiving the first split signal and providing a 90° phase shifted signal to the second 90° splitter,
wherein providing the second phase shift of the second signal comprises the second phase shifter receiving the second split signal, receiving the amplified transmit signal from the amplitude modulator, and providing a 0° to 90° phase shifted signal to the second 90° splitter combined with the amplified transmit signal, and
wherein combining the first phase shifted split signal and the second phase shifted split signal to provide the output signal comprises the second 90° splitter receiving the 90° phase shifted signal, receiving the 0° to 90° phase shifted signal combined with the amplified transmit signal, and providing the amplified transmit signal as the output signal.

12. The apparatus of claim 1, wherein the antenna transmission frequency is about 9.4 GHz.

13. A system, the system comprising:
a processor; and
memory having stored thereon instructions that, when executed by the processor, cause the processor to:
generate one or more first signals at a first frequency that is less than an antenna transmission frequency;
cause phase-lock-loop (PLL) circuitry to generate one or more transmit signals at antenna transmission frequency based on the one or more first signals; and
shape an amplitude of the one or more generated transmit signals at the antenna transmission frequency prior to transmitting,
wherein the instructions that cause the processor to shape the amplitude of the one or more generated transmit signals prior to transmitting comprises instructions that cause the processor to:
split each of the one or more transmit signals into at least a first split signal and a second split signal;
provide a first phase shift of each first split signal;
provide a second phase shift of each second split signal; and
combine each of the first phase shifted split signals and the second phase shifted split signals to provide one or more output signals corresponding to the one or more transmit signals.

14. The system of claim 13, wherein the PLL circuitry is configured to receive the first signal, detect a phase of the first signal with a PLL module, adjust the phase of the first signal with a voltage-controlled oscillator (VCO), and provide a phase-adjusted first signal.

15. The system of claim 14, further comprising:
a divide-by-two module configured to receive the phase-adjusted first signal, divide the frequency of the phase-adjusted first signal by two, and provide a divide-by-two first signal; and
a mixing module configured to receive the divide-by-two first signal, receive a reference signal, and mix the first signal with the reference signal to provide a frequency-adjusted first signal to the PLL module.

16. The system of claim 14, further comprising:
a multiply-by-two module configured to receive the phase-adjusted first signal, multiply the frequency of the phase-adjusted first signal by two, and provide a multiply-by-two first signal; and
a mixing module configured to receive the multiply-by-two first signal, receive a reference signal, and mix the first signal with the reference signal to provide a frequency-adjusted first signal to the PLL module.

17. The system of claim 14, further comprising:
a harmonic mixing module configured to receive the phase-adjusted first signal, receive a reference signal, and mix the phase-adjusted first signal with the reference signal to provide a frequency-adjusted first signal to the PLL module.

18. A transmit signal generator for a marine radar, the transmit signal generator comprising:
first circuitry configured to generate a first signal at a first frequency that is less than an antenna transmission frequency;
second circuitry configured to receive the first signal and generate a transmit signal at the antenna transmission frequency based on the first signal using phase-lock-loop (PLL) circuitry; and
third circuitry configured to shape an amplitude of the generated transmit signal at the antenna transmission frequency prior to transmitting by:
splitting each of the one or more transmit signals into at least a first split signal and a second split signal;
providing a first phase shift of each first split signal;
providing a second phase shift of each second split signal; and
combining each of the first phase shifted split signals and the second phase shifted split signals to provide one or more output signals corresponding to the one or more transmit signals.

19. The transmit signal generator of claim 18, wherein the PLL circuitry is configured to receive the first signal, detect a phase of the first signal, adjust the phase of the first signal, and provide a phase-adjusted first signal.

20. The transmit signal generator of claim 18, wherein, the PLL circuitry comprises:
a divide-by-two circuit configured to receive the phase-adjusted first signal from the VCO, divide the frequency of the phase-adjusted first signal by two, and provide a divide-by-two first signal; and
a mixer configured to receive the divide-by-two first signal from the divide-by-two circuit, receive a reference signal, and mix the first signal with the reference signal to provide a frequency-adjusted first signal to the PLL module.

21. The apparatus of claim 18, wherein the PLL circuitry comprises:
a multiply-by-two circuit configured to receive the phase-adjusted first signal from the VCO, multiply the frequency of the phase-adjusted first signal by two, and provide a multiply-by-two first signal; and a mixer configured to receive the multiply-by-two first signal from the VCO, receive a reference signal, and mix the multiply-by-two first signal with the reference signal to provide a frequency-adjusted first signal to the PLL module.

\* \* \* \* \*